US008095929B1

(12) United States Patent
Ji et al.

(10) Patent No.: US 8,095,929 B1
(45) Date of Patent: Jan. 10, 2012

(54) METHOD AND SYSTEM FOR DETERMINING A COST-BENEFIT METRIC FOR POTENTIAL VIRTUAL MACHINE MIGRATIONS

(75) Inventors: Minwen Ji, Los Altos, CA (US); Carl A. Waldspurger, Palo Alto, CA (US); John Zedlewski, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 1173 days.

(21) Appl. No.: 11/735,929

(22) Filed: Apr. 16, 2007

(51) Int. Cl.
*G06F 9/455* (2006.01)
*G06F 9/46* (2006.01)
*G06F 15/173* (2006.01)

(52) U.S. Cl. .......... 718/1; 718/105; 709/223; 709/224; 709/226

(58) Field of Classification Search .......... 718/1, 105
See application file for complete search history.

(56) References Cited

U.S. PATENT DOCUMENTS

| | | | | |
|---|---|---|---|---|
| 5,579,507 | A * | 11/1996 | Hosouchi et al. | 711/171 |
| 6,078,944 | A * | 6/2000 | Enko et al. | 718/105 |
| 6,397,242 | B1 * | 5/2002 | Devine et al. | 718/1 |
| 6,496,847 | B1 * | 12/2002 | Bugnion et al. | 718/1 |
| 6,961,941 | B1 * | 11/2005 | Nelson et al. | 719/319 |
| 7,203,944 | B1 * | 4/2007 | van Rietschote et al. | 718/104 |
| 7,228,441 | B2 | 6/2007 | Fung | |
| 7,310,684 | B2 * | 12/2007 | Patrick et al. | 709/238 |
| 7,346,471 | B2 | 3/2008 | Chickering et al. | |
| 7,474,992 | B2 | 1/2009 | Ariyur | |
| 7,577,959 | B2 * | 8/2009 | Nguyen et al. | 718/105 |
| 7,673,113 | B2 * | 3/2010 | Sugumar et al. | 711/170 |
| 7,698,709 | B2 | 4/2010 | Ditlow et al. | |
| 7,756,972 | B2 | 7/2010 | Ma | |
| 2005/0251802 | A1 | 11/2005 | Bozek et al. | |
| 2006/0005199 | A1 * | 1/2006 | Galal et al. | 718/108 |
| 2007/0180436 | A1 * | 8/2007 | Travostino et al. | 717/138 |
| 2007/0204266 | A1 * | 8/2007 | Beaty et al. | 718/1 |
| 2008/0104587 | A1 * | 5/2008 | Magenheimer et al. | 718/1 |
| 2008/0163239 | A1 * | 7/2008 | Sugumar et al. | 718/105 |
| 2008/0222633 | A1 * | 9/2008 | Kami | 718/1 |
| 2008/0263561 | A1 | 10/2008 | Tagashira | |
| 2009/0070771 | A1 | 3/2009 | Yuyitung et al. | |
| 2009/0228589 | A1 | 9/2009 | Korupolu | |
| 2010/0131959 | A1 | 5/2010 | Spiers et al. | |
| 2010/0191854 | A1 | 7/2010 | Isci et al. | |

OTHER PUBLICATIONS

Amir et al., "An opportunity cost approach for job assignment in a scalable computing cluster", *IEEE Transactions on Parallel and Distributed Systems*, vol. 11, No. 7, 2000.
Eager et al., "The Limited Performance Benefits of Migrating Active Processes for Load Sharing", *ACM SIGMETRICS*, ACM 0-89791-254-3/88/005, pp. 63-72(1988).
Gehring et al., "MARS-A Framework for Minimizing the Job Execution Time in a Metacomputing Environment," *Proceedings of Future General Computer Systems*, pp. 1-18, 1996.

(Continued)

*Primary Examiner* — Emerson Puente
*Assistant Examiner* — Charles Swift (57) ABSTRACT

A cost-benefit metric for load balancing virtual machines is used to estimate a net gain in resource availability achieved by a proposed virtual machine migration. The cost-benefit metric can be used together with any other known metrics to evaluate candidate migrations. The metric takes into account stability of loads as well as migration cost, hence can protect a system from thrashing, i.e., frequently migrating virtual machines without gaining resource availability.

42 Claims, 7 Drawing Sheets

OTHER PUBLICATIONS

Harchol-Balter et al., "Exploiting Process Lifetime Distributions for Dynamic Load Balancing", *ACM Transactions on Computer Systems (TOCS)*, vol. 15, No. 3, pp. 253-285 (Aug. 1997).

Ryu et al., "Exploiting Fine-Grained Idle Periods in Networks of Workstations", *IEEE Transactions on Parallel and Distributed Systems*, vol. 11, No. 7, pp. 683-698 (Jul. 2000).

Canturk Isci et al., "Detecting Recurrent Phase Behavior Under Real-System Variability", Department of Electrical Engineering, Princeton University, pp. 1-11.

Timothy Wood et al., "Black-box and Gray-box Strategies for Virtual Machine Migration", University of Massachusetts Amherst, pp. 1-14.

* cited by examiner

METHOD AND SYSTEM FOR DETERMINING A COST-BENEFIT METRIC FOR POTENTIAL VIRTUAL MACHINE MIGRATIONS

FIELD OF THE INVENTION

The invention relates generally to virtual machine load balancing, and specifically to determining whether the resource costs required to transfer a virtual machine are outweighed by the benefits to be obtained.

BACKGROUND OF THE INVENTION

The advantages of virtual machine technology have become widely recognized. Among these advantages is the ability to run multiple virtual machines on a single host platform. Running multiple virtual machines makes better use of the capacity of the hardware, while still ensuring that each user enjoys the features of a "complete" computer. Depending on how it is implemented, virtualization also provides greater security, because the virtualization can isolate potentially unstable or unsafe software so that it cannot adversely affect the hardware state or system files required for running the physical (as opposed to virtual) hardware.

Figure 1:
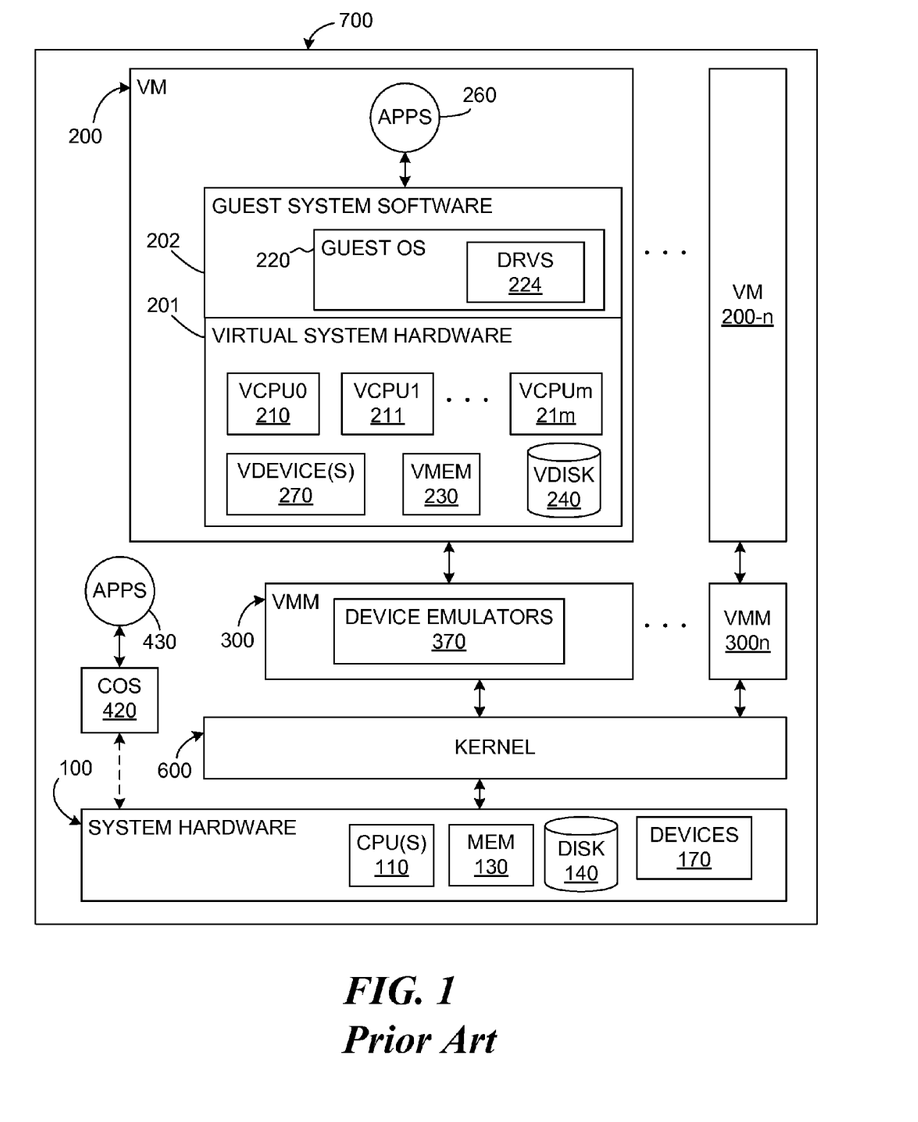
FIG. 1 is a block diagram of a computer system that implements Non-Hosted virtualization.

As is well known in the field of computer science, a virtual machine (VM) is a software abstraction—a "virtualization"—of an actual physical computer system. FIG. 1 shows one possible arrangement of a computer system 700 that implements virtualization. A VM 200 or "guest," is installed on a "host platform," or simply "host," which will include system hardware 100, that is, a hardware platform, and one or more layers of co-resident components comprising system-level software, such as an operating system (OS) or similar software layer responsible for coordinating and mediating access to hardware resources.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from multiple vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and which can execute threads independently from one another. Multi-core processors typically share only very limited resources, such as at least some cache memory. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also a translation lookaside buffer (TLB).

Similarly, a single VM may (but need not) be configured with more than one virtualized physical and/or logical processor. By way of example, FIG. 1 illustrates multiple virtual processors 210, 211, ..., 21m (VCPU0, VCPU1, ..., VCPUm) within the VM 200. Each virtualized processor in a VM may also be multi-core, or multi-threaded, or both, depending on the virtualization.

If the VM 200 is properly designed, applications 260 running on the VM will function essentially as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is usually required between the guest software within a VM and the various hardware components and devices in the underlying hardware platform. This interface—which may be referred to generally as "virtualization software" or a "virtualization layer"—may include one or more software components and/or layers, possibly including one or more of the software components known in the field of virtual machine technology as a "virtual machine monitor" (VMM), a "hypervisor," or a virtualization "kernel." Virtualization terminology has evolved over time but has not yet become fully standardized and these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself. "Hypervisor" is sometimes, however, used instead to mean some variant of a VMM alone, which interfaces with some other software layer(s) or component(s) to support the virtualization. Moreover, in some systems, virtualization code is included in at least one "superior" VM to facilitate the operations of other VMs. Furthermore, specific software support for VMs is sometimes included in the host OS itself.

Figure 2:
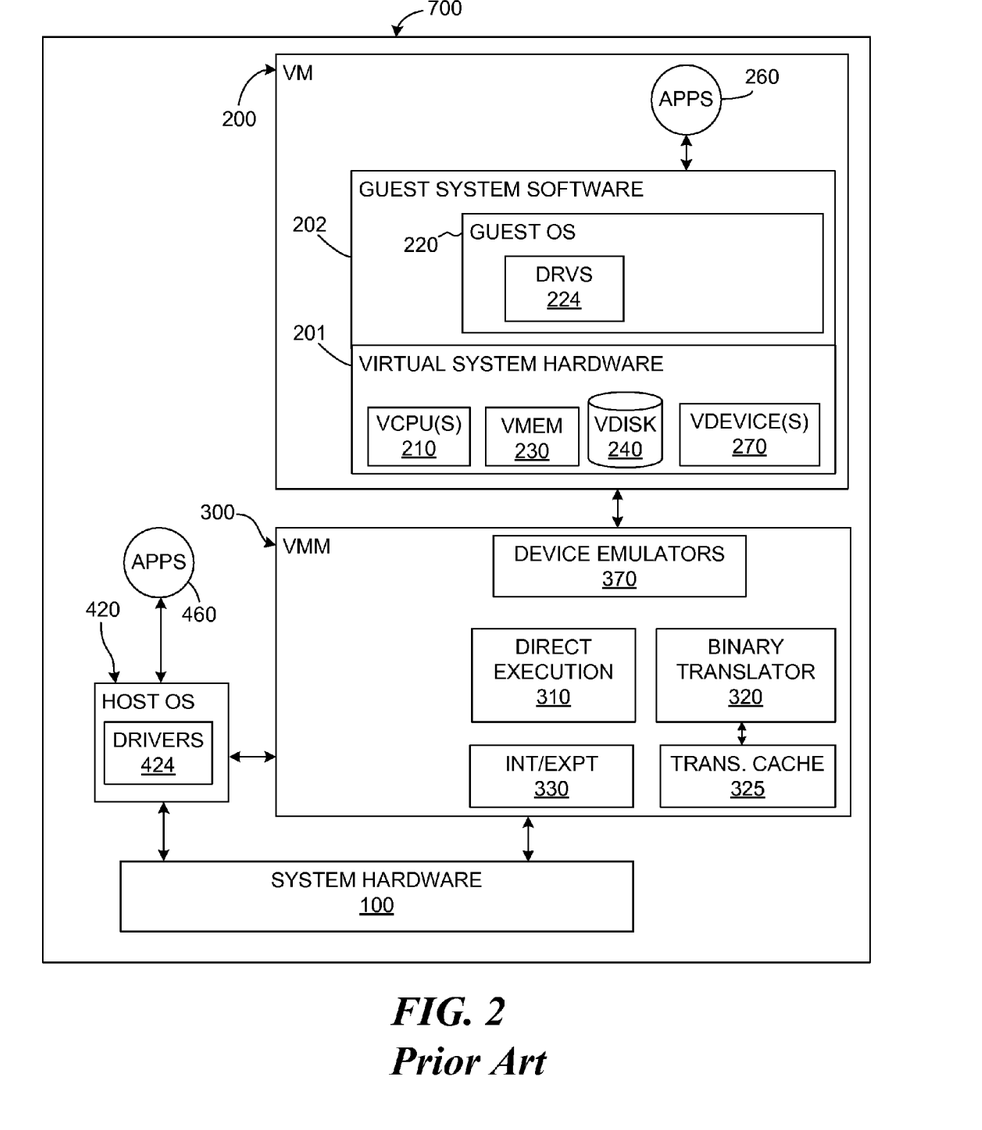
FIG. 2 is a block diagram of a computer system that implements Hosted virtualization.

By way of illustration and example only, FIGS. 1 and 2 show each VM running on, or with, a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of a virtualization software component such as the VMM 300. The host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM of a virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared to a system in which VMMs (or other software components or layers with similar functionality) run directly on the hardware platform (such as shown in FIG. 2), use of a kernel offers greater modularity and facilitates provision of services (for example, resource management) that extend across multiple virtual machines. Further, a kernel may offer greater performance because it can be co-developed with the VMM and be optimized for the characteristics of a workload consisting primarily of VMs/VMMs as compared to a hosted deployment. The kernel 600 also handles any other applications running on it that can be separately scheduled, as well as a temporary "console" operating system 420 that, in some systems, is included for such operations as booting the system as a whole or enabling certain user interactions with the kernel. The console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

Virtualization technology provides that:

1) each VM 200, . . . , 200n has its own state and is an entity that can operate completely independently of other VMs;

2) the user of a VM, that is, a user of an application running on the VM, will usually not be able to notice that the application is running on a VM (which is implemented wholly as software) as opposed to a "real" computer;

3) assuming that different VMs have the same configuration and state, the user will not know, and would have no reason to care, which VM he is currently using as long as performance was acceptable;

4) the entire state (including memory) of any VM is available to its respective VMM, and the entire state of any VM and of any VMM is available to the kernel 600; and 5) as a consequence of the foregoing, a VM is "relocatable."

As shown in FIG. 1, the multi-VM system can be implemented in a single physical machine 700, such as a server. Of course devices such as keyboards, monitors, etc., will also be included to allow users to access and use the system, via a network of any known type; these are not shown merely for the sake of simplicity.

A virtual machine is one type of process that utilizes the resources of a computer system. A virtual machine executing on a computer system will typically be limited to the resources (such as memory space, CPU cycles, network bandwidth, and so on) of that computer system. As described above, multiple virtual machines can execute on a computer system. The virtual machines executing on a first computer system typically share the resources of the first computer system. The virtual machines executing on a second computer system typically share the resources of the second computer system. The performance of a virtual machine will depend on the resources of the computer system on which it is executing, as well as the demands of any other virtual machines executing on the same computer system. This "single" platform represents a limitation that, in some situations, is undesirable and unnecessary.

Virtual machines are assigned to computer systems in a manner that balances the loads of the virtual machines among the various computer systems. Processes, such as virtual machines, are known to be balanced based on allocation policy, resource demand, and the availability of resources provided by computer systems. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, some systems implement a "migration" of a running virtual machine (VM) from one system to another.

The benefit of a migration, i.e., movement of a virtual machine from one system to another, is a "net" or "aggregate" increase in the resources available to demanding VMs. The cost of a migration is the resources consumed (including CPU cycles, memory space, network bandwidth, I/O, etc.) on behalf of the migration as well as potential slowdown of guest software running inside the VM. It may often be the case that the migrated VM will slow down other VMs on the destination host, just as its migration speeds up other VMs on the source host. There is also a risk associated with a migration in that the benefit may not last long enough to offset the cost, due to subsequent changes in loads.

It is known that virtual machines can be transferred between computer systems to balance resource loads. What is needed is a method for determining when the resource costs incurred to carryout the transfer are outweighed by the benefits.

SUMMARY OF THE INVENTION

A system for analyzing or evaluating the benefit of a proposed migration of a virtual machine against its resource cost and risk, prior to either implementing the migration or recommending its implementation.

One embodiment of the present invention introduces a cost-benefit metric for load balancing that is useful for managing dynamic workloads and non-batch processing jobs. The cost-benefit metric estimates the net gain in resource availability achieved by a proposed virtual machine migration. The cost-benefit metric can be used together with any other known metrics, such as a "load-balancing" metric to evaluate candidate migrations. The load-balancing metric of a migration is the improvement in cluster load balance if the migration is executed. The cost-benefit metric takes into account stability of loads as well as migration cost, hence can protect a system from thrashing, i.e., migrating VMs frequently without gaining resource availability.

In one embodiment, a method of evaluating a benefit of a proposed migration of a first virtual machine (VM) from a source system to a destination system, comprises: determining a first amount of a resource of a first type on the source machine; determining a second amount of the first resource type on the destination machine; determining a third amount of the first resource type to which the first VM is entitled; determining a first resource type cost-benefit metric as a function of the first, second, and third amounts of first resource type; and evaluating the benefit of the proposed migration of the first VM as a function of the first resource type cost-benefit metric.

In another embodiment, a method of determining a cost-benefit metric of a first resource type for a proposed migration of a first virtual machine (VM) from a first system to a second system, comprises: measuring an amount of the first resource type to which the first VM is entitled on the first system; measuring a total amount of the first resource type available on the first system; measuring a total amount of the first resource type available on the second system; and calculating the cost-benefit metric of the first resource type as a function of the first amount of the first resource type to which the first VM is entitled, the total amount of the first resource type available on the first system, and the total amount of the first resource type available on the second system.

Alternatively, the amount of a resource to which a VM is entitled is determined as a function of an amount of the resource used by the VM.

Still further, determining the cost-benefit metric comprises: determining a first resource type gain at the source system; and determining a first resource type gain at the destination system.

Still further the method comprises: determining a first time duration for the first resource type gain at the source system; and determining a second time duration for the first resource type gain at the destination system.

BRIEF DESCRIPTION OF THE DRAWINGS

The above and further advantages of the invention may be better understood by referring to the following description in conjunction with the accompanying drawings in which.

DETAILED DESCRIPTION

Processes, for example, virtual machines, can be moved from one computer system to another computer system in order to balance the load, i.e., usage, of limited resources. There are commercially available systems in which virtual machines are "migrated" between computer systems to accomplish this load balancing. While it has been established that imbalances and resource loads can be detected and then mitigated by this migration, there may be situations where migration of a particular virtual machine is not advantageous. Determining when a proposed migration will not be beneficial, from a resource usage perspective, can be advantageous by not "wasting" the resources necessary to complete the migration if the benefits of such a migration are not worthwhile.

The present invention introduces a resource cost-benefit metric for load balancing. The cost-benefit metric estimates the net gain in resource availability achieved by a proposed virtual machine migration. The cost-benefit metric can be used together with any other known metrics, such as a "load-balancing" metric to evaluate candidate migrations. The load-balancing metric of a migration is the improvement in cluster load balance if the migration is executed. As will be discussed in more detail below, an estimated migration gain is weighted by an expected length of the migration, while a post-migration gain is weighted by an expected stable load duration, and these weightings are computed separately for both "current" and "worst-case" load estimates.

It should be noted that "load balance" can be more general than simple resource utilization balancing. The concept of "load" may be quite general, and may incorporate VM importance, e.g., a host load metric may be a "normalized entitlement," for example, the sum of all VM resource entitlements divided by the host capacity for that resource. A normalized entitlement may be used because, in some implementations of load balancing, a resource allocation policy, specified by a user or system administrator, is taken into account. In such a situation, some VMs are more important than others. Thus, "load" can incorporate both raw resource demand and VM importance or "entitlement." "Load" can be considered to be utilization weighted by importance. If all VMs have equal importance and are actively competing for resources, then "load" does degenerate to "utilization." The present invention takes into account stability of loads as well as migration cost, hence can protect a system from thrashing, i.e., migrating VMs frequently without gaining resource availability.

The concept of "load" is very close to the concept of the amount of a resource "used" by a VM. The present approach is more general with respect to measurement of a resource load as being more than an amount of resources used. In particular, because different VMs may be assigned a different level of importance, the term "entitled" is used to indicate how much of a resource the VM "deserves" based on its demand (how much of the resource it is trying to consume) and its importance (quality-of-service parameters, e.g., reservation, shares, limit, or priority).

While the following description is presented with respect to virtual machines, embodiments of the present invention are applicable to other types of processes, and can be implemented in non-virtualized computer systems. A process can be any set of computer instructions that uses computer system resources. For example, a process can be implemented as a thread, a program, a job, a task, a partition, a capsule, a software object, and so on. Other examples of computer instructions that use computer system resources will be apparent to one of ordinary skill in the art without departing from the scope of the present invention. For the purposes of illustration, throughout this description reference is made to balancing and migration of virtual machines. It should be noted that the present invention is not limited to such applications, and that the systems and methods of the present invention may be used for balancing and migrating other processes.

As is known, processes may be balanced based on allocation policy, resource demand, and the availability of resources provided by computer systems. Balancing can be applied to computer resources such as processor time, i.e., CPU cycles, memory space, network bandwidth (including any type of input/output or bus bandwidth), storage space, power consumption, cache space, software licenses, and so on. Other examples of resources to which process balancing can be applied will be apparent to one of ordinary skill in the art without departing from the scope of the present invention. It is merely for purposes of explaining embodiments of the present invention that reference is made in relation to a system and to virtual machine migration, as will be described below with respect to FIGS. 3, 4A and 4B.

Figure 3:
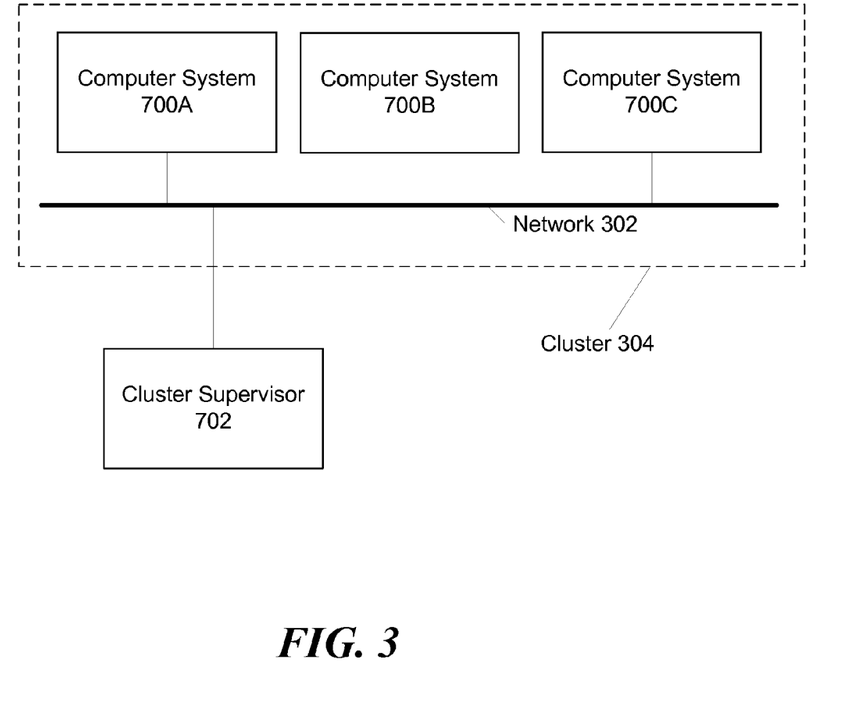
FIG. 3 illustrates a cluster of computer systems on which the present invention can be implemented.

FIG. 3 illustrates a cluster of computer systems in which embodiments of the present invention may be implemented. A cluster is a group of one or more computer systems 700. In the example illustrated, the cluster 304 includes computer systems 700A, 700B, and 700C. A cluster including three computer systems has been shown for the purpose of illustration, but other numbers of computer systems can be included in a cluster without departing from the scope of the present invention.

The computer systems 700 of the cluster 304 are connected by a network 302. The network 302 may include a storage area network (SAN), facilitating the sharing of storage devices among the computer systems 700. The network 302 allows data to be transferred among the computer systems 700 of the cluster 304.

A cluster supervisor 702 may be connected to one or more of the computer systems 700 via the network 302. A cluster supervisor 702 is a computer system exercising supervisory responsibilities over resource scheduling of one or more of the computer systems 700 of the cluster 304. For example, the cluster supervisor 702 may be implemented as a computer system running VMware VirtualCenter, available from VMware, Inc., of Palo Alto, Calif. The cluster supervisor 702 can execute a computer program to facilitate resource scheduling of the computer systems 700. The VMware Distributed Resource Scheduler (DRS) product available from VMware, Inc., of Palo Alto, Calif., is one example of such a computer program.

The cluster supervisor 702 may monitor the computer systems 700 to determine resource demand and usage by various processes executing on the computer systems 700. As another example, the cluster supervisor 702 can receive metrics of resource demand and usage from the various computer systems 700 to evaluate resource allocation decisions.

The cluster supervisor 702 balances the processes executing on at least some of the computer systems 700 of the cluster 304. For example, the cluster supervisor 702 may instruct a computer system 700 to adjust its allocation of resources to a particular process. As another example, the cluster supervisor 702 can initiate a migration of a process, e.g., a virtual machine, from a first computer system to a second computer system. Advantageously, the cluster supervisor 702 may react dynamically to changes in resource demand in the cluster and adjust allocation of computer system resources accordingly.

For the purposes of illustration, the cluster supervisor 702 has been shown as separate from the computer systems 700 of the cluster 304. The structures and functions of a cluster supervisor can be included in a computer system 700 of the cluster. Thus, one (or more) of the computer systems 700 can play a supervisory role in balancing of processes, while also executing migratable processes of its own. Furthermore, the structures and functions of a cluster supervisor can be included in a virtual machine executing in a computer system 700 of the cluster. The cluster supervisor itself can be implemented as a migratable process.

As described above, a computer system 700 can execute one or more virtual machines. A virtual machine is one type of process that can be executed, balanced, and/or migrated.

Embodiments of the present invention directed towards evaluating the potential benefits of balancing of virtual machines are particularly useful, as virtual machines generally have well-defined resource requirements, an expectation to be highly robust, and can be implemented as migratable processes.

Figure 4A:
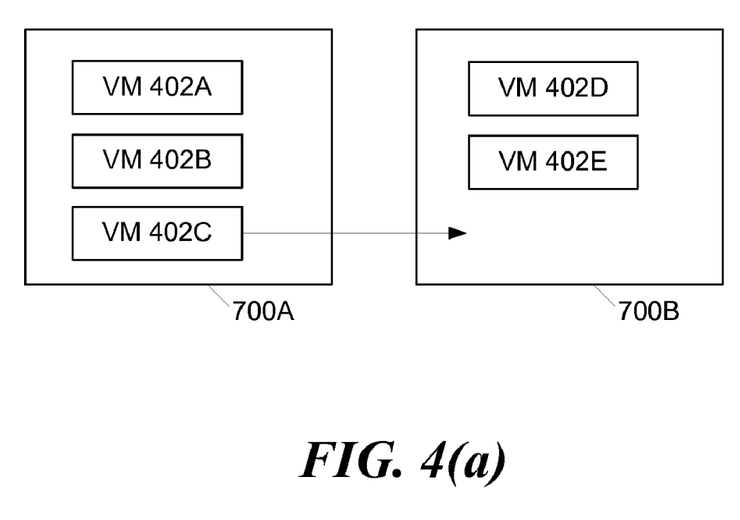
FIGS. 4(a) and 4(b) illustrate migration of a virtual machine from a source system to a destination system.
Figure 4B:
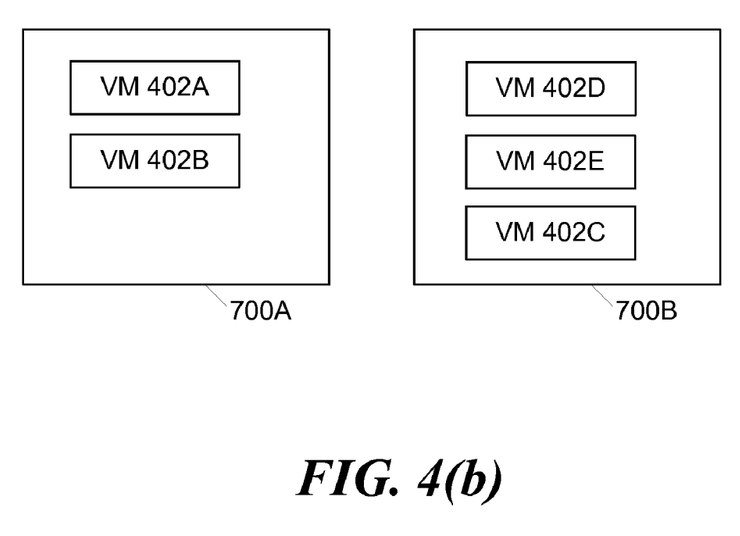

FIGS. 4(a) and 4(b) illustrate migration of a first virtual machine on a source computer system to a destination computer system. As shown in FIG. 4(a), computer system 700A executes three virtual machines: VM 402A, VM 402B, and VM 402C. Computer system 700B executes VM 402D and VM 402E. In the example illustrated, VM 402C is migrated from computer system 700A to computer system 700B.

FIG. 4(b) illustrates the result of the migration of VM 402C. Computer system 700A now executes VM 402A and VM402B, and computer system 700B now executes VM 402D, VM 402E, and VM 402C. Typically, migrating a virtual machine from a first computer system to a second computer system includes transferring memory and non-memory state data from a source virtual machine to a destination virtual machine, halting execution of the source virtual machine, and resuming execution on the destination virtual machine. Various methods for migrating virtual machines are known. Migrating virtual machines beneficially facilitates dynamic rebalancing of virtual machines in a cluster. A process (such as a virtual machine) can be migrated to a computer system in the same cluster, but need not be as it could be migrated to a computer system in a different cluster.

In accordance with one embodiment of the present invention, an algorithm is implemented to calculate the cost-benefit metric that may be used to determine whether or not the migration of VM 402C is cost-effective.

The cost-benefit metric estimates the net gain in resource availability achieved by a proposed migration.

Figure 5:
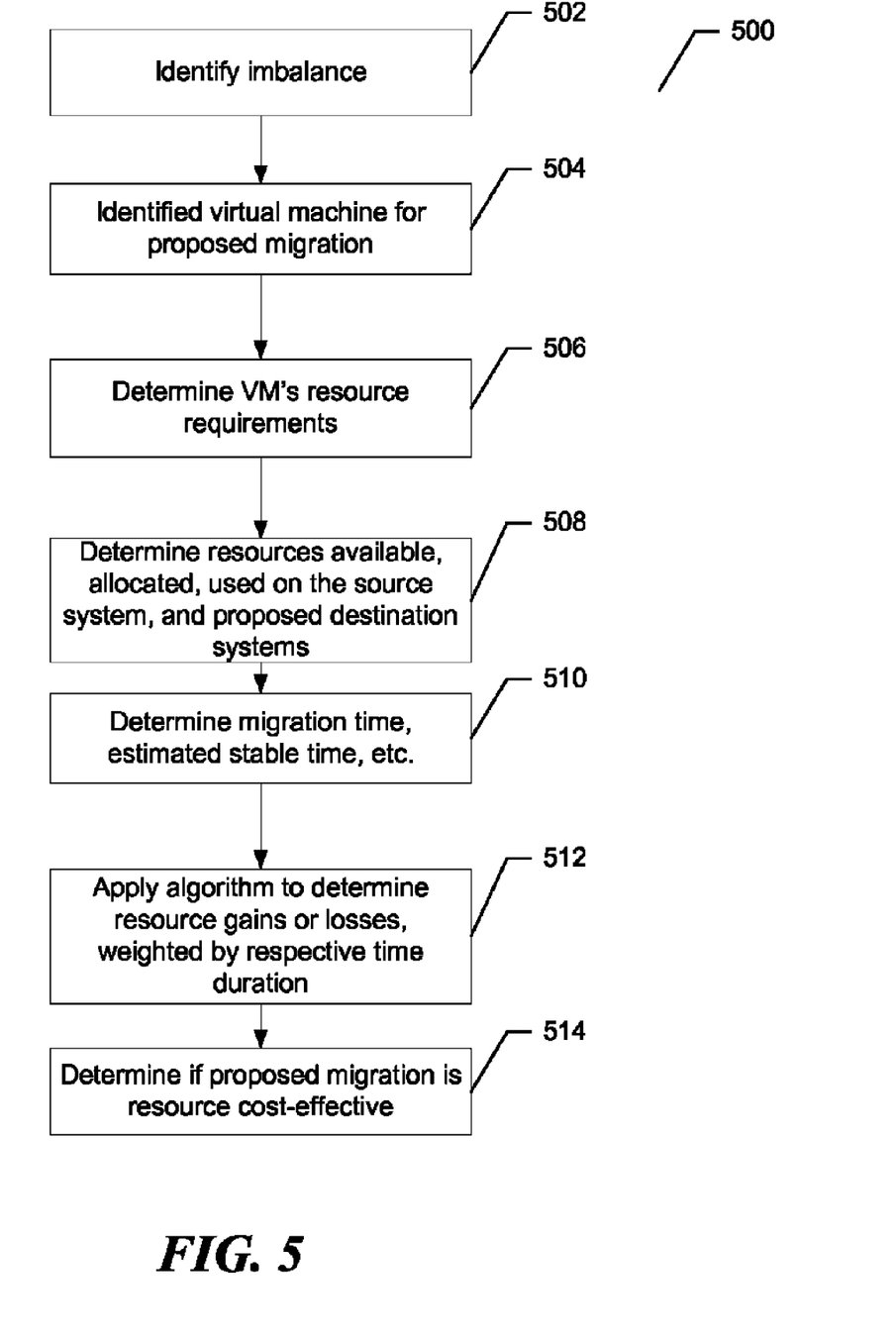
FIG. 5 illustrates a method in accordance with one embodiment of the present invention.

As shown in FIG. 5, a method 500 in accordance with one embodiment of the present invention begins at step 502 where an imbalance in resources is identified. At step 504 a virtual machine (VM) is identified for proposed migration. The identified VM's resource requirements are determined, step 506. The resources available, demanded, and used on the source system at which the identified virtual machine is located and those of a proposed destination system are determined, step 508. A migration time, estimated stable time and other related time periods, that will be discussed in more detail below, are determined at step 510. An algorithm is applied to determine any resource gains or losses, weighted by respective time durations, at step 512. Based on an outcome of the applied algorithm, a determination is made as to whether the proposed migration of the virtual machine is resource cost-effective at step 514. Details of the method 500 will now be discussed in more detail.

A resource gain after a migration is computed as the additional resources made available to demanding VMs on the source host after the migration, plus the additional resources available to, and demanded by, the migrated VM on the destination host, all assuming resources allocated to existing VMs on the destination remain the same. The gain on the destination can be negative. The resource gain can be estimated using data on recent loads of the VMs or other predictors of near-future load on the source and destination hosts. One component of the present invention addresses the issue of how long such a gain can be sustained and what gain will remain after loads change such that any current gain can no longer be sustained.

In the description to follow there is reference to resource "gain," "load," and "loss." Loss is the negation of gain but load is a separate concept from gain/loss. For example, there may be a 5000 MHz CPU cycle load on a host, i.e., VMs running on the host demand 5000 Mhz of CPU cycle resource. Moving a VM with a 1500 MHz cycle load from a first system to a second system, VMs on the first system may gain 1000 MHz and VMs on the second system may lose 500 MHz CPU cycles. It should be noted that load cannot be 1:1 translated into gain or loss, because other factors, such as idle resources on the hosts, also play a role.

A migration may be implemented and appear to have a negative resource gain. For example, if a migration can correct a severe load imbalance (which is a different metric from cost-benefit), it may still be recommended.

One embodiment of the present invention takes a conservative approach to the gain calculation. An estimated stable period (ESP) is determined by analysis of the recorded load history, for example, for the past hour, to identify the weighted average time period that the loads were stable. It is assumed that the resource gain computed from the current loads will last for the estimated stable period. "Current load" refers to a load estimate based on statistics of the most recent N minutes, where N is a configurable parameter and defaults to 5.

In one embodiment of the present invention, the estimated stable period is set to be the shorter of the source system estimated stable period and the destination system estimated stable period.

For any time beyond the estimated stable period, a resource gain using the "worst-case" loads in the load history, called the worst-case resource gain hereafter, is calculated. The worst-case loads for resource gain are the lowest loads on the source host and the highest loads on the destination host or any other conservative approximation of source and destination load. The data points can be 1-minute averages, instead of raw samples. Both "lowest" and "highest" loads are non-negative.

While one embodiment of the present invention is conservative (using the estimated stable period and the worst-case loads), another embodiment may use less conservative values, e.g., the Nth worst-case percentile of loads.

The resource gain during a migration (called migration gain hereafter) is the negation of the amount of resources taken away from demanding VMs by the migration on the source and destination hosts, which includes resources reserved for the migration and the mirror of the VM memory on the destination. The act of performing a migration itself consumes non-trivial resources, including CPU time or cycles, memory space, I/O bandwidth, etc. The migration gain is computed using the current loads for the shortest stable period. If the migration is expected to take longer than the shortest stable period, the migration gain using the "worst-case" loads in the load history for the excess migration time is computed. The worst-case loads for a migration are the highest loads on both source and destination hosts.

Overall, the net resource gain of a migration is the sum of the current gain, worst-case gain, current migration gain and worst-case migration gain, each weighted by its respective estimated duration.

In a situation or analysis where it is assumed that the estimated migration time is longer than the shortest stable period, then from the time when the migration starts until the time when the shortest stable period ends, it is assumed that the VMs will have the same loads as their current loads.

Resource gain (be it current or worst-case) is the delta in resource available to and wanted by VMs on the source and destination hosts, before and after the migration. That is, $$gain=(srcWantedAndAvailAfterMigration+dstWantedAndAvailAfterMigration)-(srcWantedAndAvailBeforeMigration+dstWantedAndAvailBeforeMigration).$$

Where, for example, after a migration, the VMs running on the source host demand 5000 MHz of CPU cycles, but only 4000 MHz is available on the source, then srcWantedAndAvailAfterMigration=4000 MHz. But if 6000 MHz were available, then srcWantedAndAvailAfterMigration=5000 MHz. Effectively, srcWantedAndAvailAfterMigration=minimum of demand and capacity and the other amounts are similarly calculated.

The four variables above can be computed from the current loads, in which case the resulting gain would be the current gain, or from the worst-case loads, in which case the resulting gain would be the worst-case resource gain.

There are possibly 4 different time periods (but at most 3 of them can have a non-zero length in any give case), as determined by the combination of migration completion time and estimated stable period:

1. CurrentMigrateTime: migration is in progress and the workload remains the same as the current workload. Serves as a weight to "CurrentMigrationGain."

2. CurrentTime: migration has completed and the workload remains the same as the current workload. Serves as a weight to "CurrentGain."

3. Worst-caseMigrateTime: migration is going on and the workload changes to its worst-case possibility, i.e., the estimated stable period has expired. (Either 2 or 3 can be of non-zero length, but not both.) Serves as a weight to "Worst-caseMigrationGain."

4. Worst-caseTime: migration has completed and the workload changes to its worst-case possibility. Serves as a weight to "Worst-caseGain."

The estimated migration gain is weighted by the expected length of the migration, while the post-migration gain is weighted by the expected stable load duration, and these weightings are computed separately for both the 'current' and 'worst-case' load estimates.

The migration time can be estimated by taking a moving average of past migration times. Alternatively, the migration time may be estimated from one or more of the virtual machine's memory space footprint, working set size, network bandwidth, etc.

It may appear that the duration of the worst-case gain is open-ended. In order to give it a proper weight relative to the other gains, however, the total time is restricted to the maximum of:
the load-balancing invocation interval (default 5 minutes);
the expected migration time; and
the estimated stable period.

This limitation is a reasonable restriction because the cluster supervisor will evaluate the possible gains again upon its next invocation, which may occur after a migration completes or after a fixed period of time.

The total time refers to the total period of time in which the various gains and losses are weighed or evaluated.

If a candidate migration has a low gain based on current loads or the current gain lasts for a short period, and it has a high migration cost or a negative gain based on worst-case loads, then it is likely to be rejected by the cost-benefit metric calculation.

Scenario A

As one non-limiting example, if a candidate migration has the following characteristics, for the CPU resource:
source host gains 1000 MHz and destination host loses 800 MHz, so the net gain based on current loads is 200 MHz (Current Gain) and will last 5 minutes (ESP), and
the migration cost is 500 MHz (CurrentMigrationLoss or Worst-caseMigrationLoss, depending on whether ESP>MigrationTime) and the migration will take 2 minutes (migration time),
then the cost-benefit metric is 200*5−500*2=0.

Scenario B

In another non-limiting example, if a candidate migration has the following characteristics, for the CPU resource:
source host gains 1000 MHz and destination host loses 800 MHz, so the net gain based on current loads is 200 MHz (Current Gain) and will last 5 minutes (ESP), and
the loss based on worst-case loads is 250 MHz (Worst-caseLoss) and will last 4 minutes (Worst-caseTime=invocation interval−ESP),
then the cost-benefit metric is 200*5−250*4=0.

Scenario C

In another non-limiting example, if a candidate migration has the following characteristics, for the CPU resource:
the net gain based on current loads is 1000 MHz (Current Gain) but will last 3 minutes (ESP), and
the migration cost is 500 MHz (CurrentMigrationLoss or Worst-caseMigrationLoss, depending on whether ESP>MigrationTime) and the migration will take 2 minutes (migration time),
then the cost-benefit metric is 1000*3−500*2=2000.

Scenario D

In another non-limiting example, if a candidate migration has the following characteristics, for the CPU resource:
the net gain based on current loads is 1000 MHz (Current Gain) but will last only 1 minute (ESP), and
the loss based on worst-case loads is 250 MHz (Worst-caseLoss) and will last 5 minutes (Worst-caseTime=invocation interval−ESP),
then the cost-benefit metric is 1000*1−250*5=−250.

Figure 6:
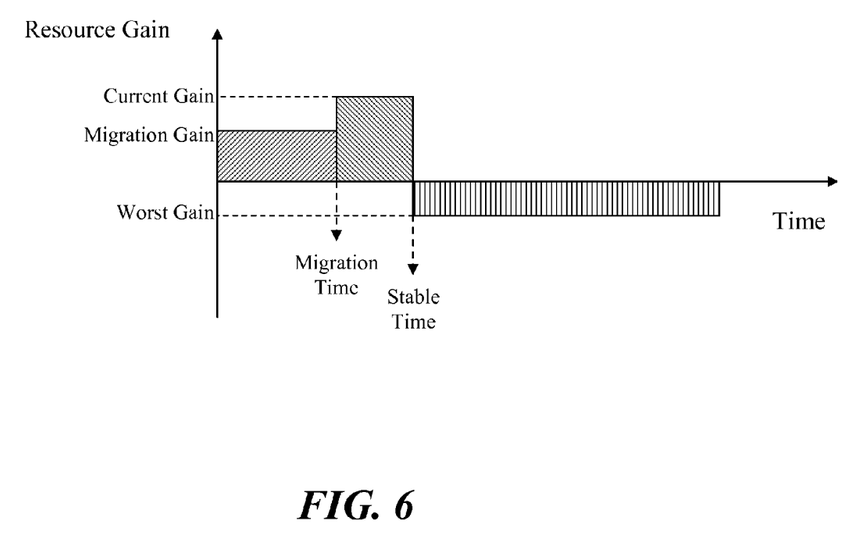
FIG. 6 is a graphical representation of the net resource gain of a migration in accordance with one embodiment of the present invention.

The net resource gain of a migration is the sum of the current gain, worst-case gain, current migration gain and worst-case migration gain, each weighted by its estimated duration, as represented in FIG. 6. It should be noted that the example represented in FIG. 6 shows that the migration time is shorter than the estimated stable time. And, as a result, the worst-case migration gain has a weight of 0.

The final score for each candidate migration is a function of both the load-balancing and cost-benefit metrics. In one embodiment, a 5-point rating mechanism is implemented to integrate the two metrics. The migration is recommended if and only if the sum of its ratings in both metrics is greater than 0. Each metric is mapped to one of the following 5 ratings:
  −2—definitely reject, regardless of the other metric
  −1—accept only if the other rating is strongly accept
  0—neutral, leave the decision to the other metric
  1—accept if the other metric is neutral
  2—strongly accept, or reject only if the other rating is definitely reject.

The following is pseudo-code for mapping a cost-benefit that is using relative, i.e., normalized, values, e.g., net gain divided by the source system and destination system capacity and reductions expressed as percentages:

```
if (costbenefit<−0.1) {
// The move could reduce resource availability by 10%, so
// definitely reject it.
return −2;
} else if (costbenefit<0.0) {
```

```
    // The move could have a negative gain in resource avail-
        ability,
    // so reject it unless the other metric strongly accepts it.
    return -1;
} else if (costbenefit==0.0) {
    // The move doesn't help or hurt resource availability, so
    // reject it unless the other metric accepts it.
    return 0;
} else if (costbenefit<0.1){
    // The move improves resource availability, so accepts it
        unless
    // the other metric rejects it. This is less likely to happen
    // though because the cost benefit metric is typically more
    // conservative than the load balance metric. So this rating
        is
    // useful in the case that the move improves load balance
    // by an amount below threshold, but has a positive gain in
    // resource availability due to stability of the loads or low
    // migration cost or both.
    return 1;
} else {
    // The move improves resource availability by a significant
    // amount (10%), so accepts it unless the other metric
        strongly
    // rejects it.
    return 2;
}
```

Note that the normalized "costBenefit" number above is the total gain normalized by the source and destination host capacity. Where the above variable "costbenefit" is computed as (weighted sum of gains/(srcCapacity+dstCapacity)).

Figure 7:
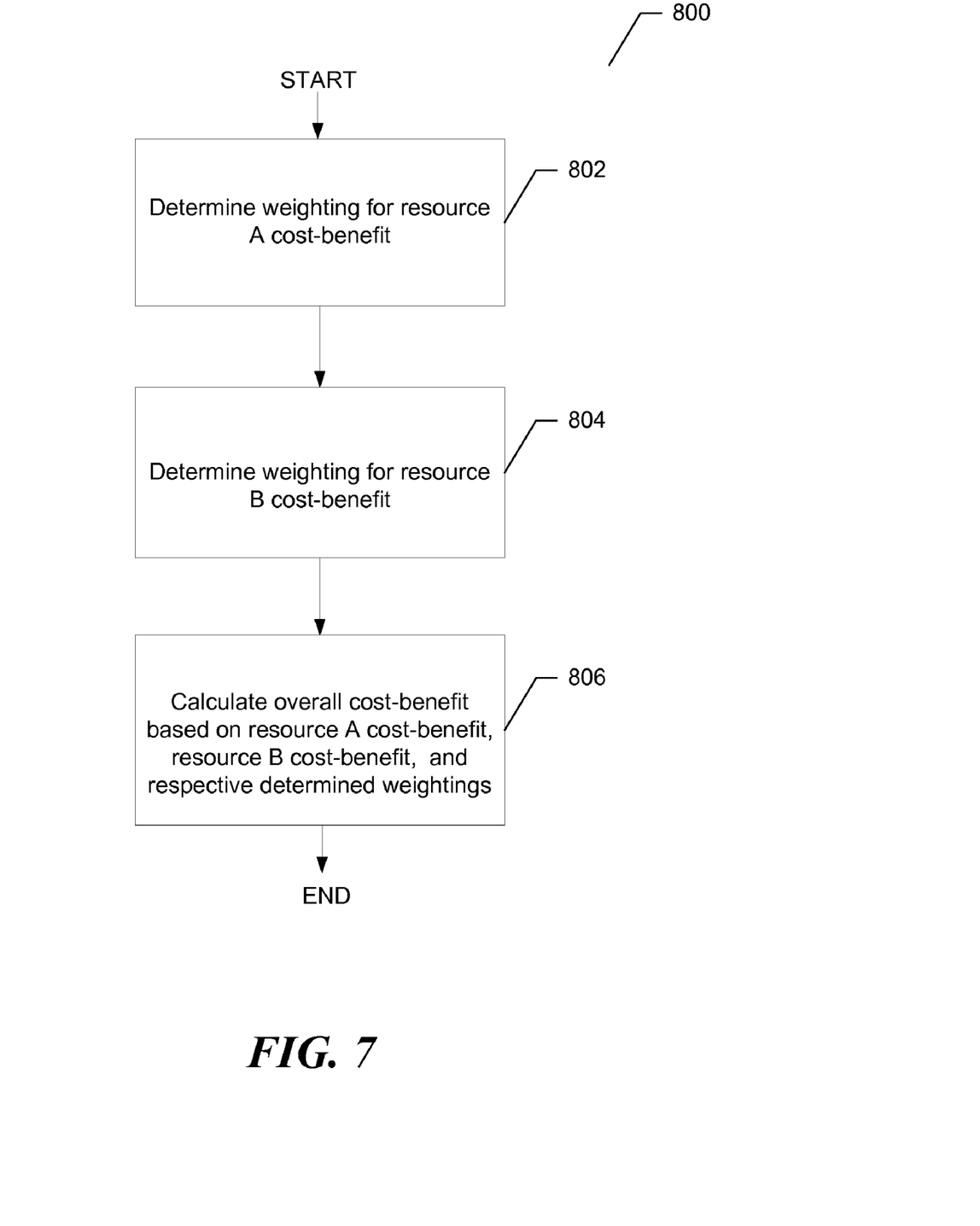
FIG. 7 illustrates a method in accordance with another embodiment of the present invention.

FIG. 7 illustrates a method 800 for calculating an overall cost-benefit based on at least two resource cost-benefits, according to one embodiment of the present invention. In one embodiment, the method is performed by the cluster supervisor 702, but the method can be performed by other entities without departing from the scope of the present invention.

Each "resource" gain/loss is measured individually, e.g., a gain/loss for memory space, a gain/loss for CPU cycles, etc. A cost-benefit metric is then calculated for each resource individually, and then integrated.

The cluster supervisor 702 determines, step 802, a weighting for resource A cost-benefit and determines, step 804, a weighting for resource B cost-benefit. According to one embodiment of the present invention, the weighting for resource A cost-benefit and the weighting for resource B cost-benefit depend on whether any computer systems 700 are overcommitted on resource A or resource B. A computer system 700 is overcommitted on a resource if the dynamic entitlements to the resource of the virtual machines executing on the computer system 700 exceed the available supply of the resource on the computer system 700. In one embodiment, a computer system is identified as being overcommitted on a resource based on a "normalized entitlement" of the resource for that computer system. The "normalized entitlement" is the sum of the entitlements for all VMs on the host (for some resource), divided by the capacity of the host (for the same resource).

In one embodiment, resource A cost-benefit represents memory cost-benefit and resource B cost-benefit represents processor time (CPU cycles) cost-benefit. These examples have been chosen for the purpose of illustration and are not limiting. Any kind of resource cost-benefit can be combined with any other kind of resource cost-benefit to determine overall cost-benefit without departing from the scope of the present invention.

In one embodiment, if memory is overcommitted on any computer system, memory cost-benefit is given a higher weighting and processor time cost-benefit is given a lower weighting. Giving memory cost-benefit a higher weight when memory is overcommitted advantageously prioritizes migrations to improve memory space balance, thereby reducing the likelihood of thrashing due to overly constrained memory conditions. If memory is not overcommitted on any computer system, but processor time is overcommitted on any computer system, processor time cost-benefit is given a higher weighting and memory cost-benefit is given a lower weighting. Giving processor time cost-benefit a higher weight when processor time is overcommitted but memory is not overcommitted advantageously prioritizes migrations to improve processor time balance, thereby stressing the importance of the overcommitted resource. If neither memory nor processor time is overcommitted on any computer system, memory cost-benefit and processor time cost-benefit are given the same weighting. Giving memory cost-benefit and processor time the same weighting when neither resource is overcommitted advantageously balances the allocation concerns of both resources. In another embodiment, the weighting of resource A cost-benefit and resource B cost-benefit can be configured by a user.

The cluster supervisor 702 calculates, step 806, the overall cost-benefit CB based on the resource A cost-benefit, the determined weighting for resource A cost-benefit, the resource B cost-benefit, and the determined weighting for resource B cost-benefit. For example, overall cost-benefit CB can be calculated as:

$$CB=(A*wa)+(B*wb)$$

wherein A is the resource A cost-benefit, wa is the weighting for resource A cost-benefit, B is the resource B cost-benefit, and wb is the weighting for resource B cost-benefit. Calculating the overall cost-benefit based on resource cost-benefit and overcommitment-based weighting factors advantageously allows overall cost-benefit to reflect the resource cost-benefit of the more critically overcommitted resources. It should be noted that the weighting values wa and wb are chosen such that (wa+wb)=1.

As an exemplary calculation:
Overall cost-benefit=CPU cost-benefit*0.50+memory cost-benefit*0.50, if neither CPU nor memory are overcommitted on any hosts in a cluster;
Overall cost-benefit=CPU cost-benefit*(Weight)+memory cost-benefit*(1−Weight), if CPU is overcommitted on any host and memory is not overcommitted on any host;
Overall cost-benefit=CPU cost-benefit*(1−Weight)+memory cost−benefit*(Weight), if memory is overcommitted on any host, regardless of any CPU overcommitment condition that may be present;
where Weight is a configurable parameter greater than 0.5 and defaults to 0.75.

One of ordinary skill in the art will understand that there are a number of combining functions that can be used in place of the above weighted sum.

In summary, a method for determining a resource cost-benefit metric of process migrations has been described, where:

1. The process is a virtual machine software program. Unlike batch jobs, these processes' performance cannot be measured in completion times because many VMs are long-lived (with uptimes measured in days, months, or years), and act as servers, so the amount of work that they will perform is not known up-front, and may vary significantly over time, and may even depend on external factors. Instead, their performance can be inferred from the amount of resources allocated to, and consumed by, the processes on a periodic basis.

2. The method aims to maximize the amount of resources available to the demanding processes, rather than to minimize the completion times of the processes.

3. The method can be run efficiently online.

4. The method does not require application level metrics, such as latency or throughput. It does not require any modification or instrumentation of the processes. It can compute the metric based on the estimated demand of processes in terms of units of physical resources (e.g., MHz for CPU cycles and MB for memory space).

5. In addition to the potential benefit and cost of migrations, the method takes into account idle resources in the system. For example, if a migration consumes only cycles that will otherwise be idle, then it will not affect the performance of other processes. Additionally, the system takes into account the dynamic resource entitlements as well.

6. The method also takes into account risks of migrations. For example, due to dynamic changes in workload, a migration that can improve resource availability now may turn out to decrease resource availability some time later.

Embodiments of the present invention have been described with respect to evaluating a virtual machine migration that has been proposed to cure a load imbalances. A similar approach can be extended to any scarce resource, e.g., storage, networking, etc.

As described above, FIGS. 1 and 2 depict non-hosted and hosted implementations of virtualized machines. Embodiments of the present invention are applicable at least to both such implementations of virtualized machines, as well as para-virtualized virtual machines. In other words, the present invention is not restricted to use in systems with any particular "degree" of virtualization. Unless otherwise indicated or apparent from the description, it is to be assumed that the invention can be implemented anywhere within the overall structure of the virtualization software, and even in systems that provide specific hardware support for virtualization.

Reference in the specification to "one embodiment" or to "an embodiment" indicates that a particular feature, structure, or characteristic described in connection with the embodiments is included in at least one embodiment of the invention. The appearances of the phrase "in one embodiment" in various places in the specification are not necessarily all referring to the same embodiment.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

Finally, it should be noted that the language used in the specification has been principally selected for readability and instructional purposes, and may not have been selected to delineate or circumscribe the inventive subject matter. Accordingly, the disclosure of the present invention is intended to be illustrative of, but not limiting to, the scope of the invention, which is set forth in the following claims.

While the invention has been particularly shown and described with reference to several alternate embodiments, it will be understood by persons skilled in the relevant art that various changes in form and details can be made therein without departing from the spirit and scope of the invention.

What is claimed is:

1. A method of evaluating a benefit of a proposed migration of a first virtual machine (VM) from a source system to a destination system, the method comprising:
   determining a first amount of a resource of a first type on the source system;
   determining a second amount of the first resource type on the destination system;
   determining a third amount of the first resource type to which the first VM is entitled;
   determining a first resource type cost-benefit metric as a function of the first, second, and third amounts of first resource type;
   evaluating the benefit of the proposed migration of the first VM as a function of the first resource type cost-benefit metric, wherein the first resource type cost-benefit metric is based on a migration cost and a migration benefit, the migration cost being indicative of negative gain from the migration, while the migration benefit is indicative of positive gain from the migration;
   determining a migration time necessary to migrate the first VM from the source system to the destination system; and
   determining the first resource type cost-benefit metric as a function of the determined migration time.

2. The method of claim 1, further comprising:
   determining the third amount of the first resource type to which the first VM is entitled as a function of at least one of:
   an amount of the first resource type used by the first VM;
   one or more quality-of-service parameters associated with the first VM; and
   one or more parameters used to determine an allocation of resources to the first VM.

3. The method of claim 1, further comprising:
   determining a fourth amount of a resource of a second type on the source system;
   determining a fifth amount of the second resource type on the destination system;
   determining a sixth amount of the second resource type to which the first VM is entitled;
   determining a second resource type cost-benefit metric as a function of the second, second, and third amounts of second resource type; and
   evaluating the benefit of the proposed migration of the second VM as a function of the second resource type cost-benefit metric.

4. The method of claim 3, wherein:
   the first resource is one of: memory space, CPU cycles, and storage space; and
   the second resource is an other of: memory space, CPU cycles, and storage space.

5. The method of claim 3, further comprising:
determining the sixth amount of the second resource type to which the first VM is entitled as a function of an amount of the second resource type used by the first VM.

6. The method of claim 1, wherein the source system and destination system are part of a cluster of systems, the method further comprising:
detecting a load imbalance in the cluster of systems.

7. The method of claim 6, wherein the detected load imbalance is for the first resource type.

8. The method of claim 1, wherein determining the first resource type cost-benefit metric comprises:
determining a first resource type gain at the source system; and
determining a first resource type gain at the destination system.

9. The method of claim 8, further comprising:
determining a first time duration for the first resource type gain at the source system; and
determining a second time duration for the first resource type gain at the destination system.

10. The method of claim 9, wherein at least one of the first and second time duration is an estimated stable period of time.

11. The method of claim 1, wherein the migration time is determined as a function of at least one of:
an amount of memory used by the first VM;
a working set size of the first VM; and
an amount of network bandwidth used by the first VM.

12. The method of claim 1, wherein the migration time is determined as a function of past migration times.

13. The method of claim 12, wherein the migration time is determined as a moving average of the past migration times.

14. The method of claim 1, wherein the determining of the first resource type cost-benefit metric as said function of the determined migration time includes applying the determined migration time as a weight to a gain of the first resource type during a migration to determine the first resource type cost-benefit metric.

15. A method of evaluating a benefit of a proposed migration of a first virtual machine (VM) from a first system to a second system, the method comprising:
determining an amount of the first resource type to which the first VM is entitled on the first system;
determining a total amount of the first resource type available on the first system;
determining a total amount of the first resource type available on the second system;
calculating the cost-benefit metric of the first resource type as a function of the first resource type to which the first VM is entitled, the total amount of the first resource type available on the first system, and the total amount of the first resource type available on the second system, wherein the first resource type cost-benefit metric is based on a migration cost and a migration benefit, the migration cost being indicative of negative gain from the migration, while the migration benefit is indicative of positive gain from the migration;
determining a migration time necessary to migrate the first VM from the first system to the second system; and
determining the first resource type cost-benefit metric as a function of the determined migration time.

16. The method of claim 15, further comprising:
determining a first resource type gain at the first system;
determining a first resource type gain at the second system; and
calculating the cost-benefit metric as a function of the determined first resource type gains at the first and second system.

17. The method of claim 16, further comprising:
determining a first time duration for the first resource type gain at the source system;
determining a second time duration for the first resource type gain at the destination system; and
calculating the cost-benefit metric as a function of the determined first resource type gains at the first and second systems weighted by the first and second time durations, respectively.

18. The method of claim 17, wherein at least one of the first and second time duration is an estimated stable period of time.

19. The method of claim 15, further comprising:
determining the migration time as a function of at least one of:
an amount of memory used by the first VM;
a working set size of the first VM; and
an amount of network bandwidth used by the first VM.

20. The method of claim 15, further comprising:
determining the amount of the first resource type to which the first VM is entitled as a function of at least one of:
an amount of the first resource type used by the first VM;
one or more quality-of-service parameters associated with the first VM; and
one or more parameters used to determine an allocation of resources to the first VM.

21. The method of claim 15, wherein the calculating of the first resource type cost-benefit metric as said function of the determined migration time includes applying the determined migration time as a weight to a gain of the first resource type during a migration to determine the first resource type cost-benefit metric.

22. A computer program product for evaluating a benefit of a proposed migration of a first virtual machine (VM) from a source system to a destination system, the computer program product comprising a computer-readable storage medium storing computer program code for performing the method comprising:
determining a first amount of a resource of a first type on the source system;
determining a second amount of the first resource type on the destination system;
determining a third amount of the first resource type to which the first VM is entitled;
determining a first resource type cost-benefit metric as a function of the first, second, and third amounts of first resource type;
evaluating the benefit of the proposed migration of the first VM as a function of the first resource type cost-benefit metric, wherein the first resource type cost-benefit metric is based on a migration cost and a migration benefit, the migration cost being indicative of negative gain from the migration, while the migration benefit is indicative of positive gain from the migration;
determining a migration time necessary to migrate the first VM from the source system to the destination system; and
determining the first resource type cost-benefit metric as a function of the determined migration time.

23. The computer program product of claim 22, the method further comprising:
determining the third amount of the first resource type to which the first VM is entitled as a function of at least one of:

an amount of the first resource type used by the first VM;
one or more quality-of-service parameters associated with the first VM; and
one or more parameters used to determine an allocation of resources to the first VM.

24. The computer program product of claim 22, the method further comprising:
determining a fourth amount of a resource of a second type on the source system;
determining a fifth amount of the second resource type on the destination system;
determining a sixth amount of the second resource type to which the first VM is entitled;
determining a second resource type cost-benefit metric as a function of the second, second, and third amounts of second resource type; and
evaluating the benefit of the proposed migration of the second VM as a function of the second resource type cost-benefit metric.

25. The computer program product of claim 24, wherein:
the first resource is one of: memory space, CPU cycles, and storage space; and
the second resource is an other of: memory space, CPU cycles, and storage space.

26. The computer program product of claim 24, the method further comprising:
determining the sixth amount of the second resource type to which the first VM is entitled as a function of the amount of the second resource type used by the first VM.

27. The computer program product of claim 22, wherein the source system and destination system are part of a cluster of systems, the method further comprising:
detecting a load imbalance in the cluster of systems.

28. The computer program product of claim 27, wherein the detected load imbalance is for the first resource type.

29. The computer program product of claim 22, wherein determining the first resource type cost-benefit metric comprises:
determining a first resource type gain at the source system; and
determining a first resource type gain at the destination system.

30. The computer program product of claim 29, wherein the method further comprises:
determining a first time duration for the first resource type gain at the source system; and
determining a second time duration for the first resource type gain at the destination system.

31. The computer program product of claim 30, wherein at least one of the first and second time duration is an estimated stable period of time.

32. The computer program product of claim 22, wherein the method further comprises:
determining the migration time as a function of at least one of:
an amount of memory used by the first VM;
a working set size of the first VM; and
an amount of network bandwidth used by the first VM.

33. The computer program product of claim 22, wherein the migration time is determined as a function of past migration times.

34. The computer program product of claim 33, wherein the migration time is determined as a moving average of the past migration times.

35. The computer program product of claim 22, wherein the determining of the first resource type cost-benefit metric as said function of the determined migration time includes applying the determined migration time as a weight to a gain of the first resource type during a migration to determine the first resource type cost-benefit metric.

36. A computer program product for evaluating a benefit of a proposed migration of a first virtual machine (VM) from a first system to a second system, the computer program product comprising a computer-readable storage medium storing computer program code for performing the method comprising:
determining an amount of the first resource type to which the first VM is entitled on the first system;
determining a total amount of the first resource type available on the first system;
determining a total amount of the first resource type available on the second system;
calculating the cost-benefit metric of the first resource type as a function of the first resource type to which the first VM is entitled, the total amount of the first resource type available on the first system, and the total amount of the first resource type available on the second system, wherein the first resource type cost-benefit metric is based on a migration cost and a migration benefit, the migration cost being indicative of negative gain from the migration, while the migration benefit is indicative of positive gain from the migration;
determining a migration time necessary to migrate the first VM from the first system to the second system; and
determining the first resource type cost-benefit metric as a function of the determined migration time.

37. The computer program product of claim 36, wherein the method further comprises:
determining a first resource type gain at the first system;
determining a first resource type gain at the second system; and
calculating the cost-benefit metric as a function of the determined first resource type gains at the first and second system.

38. The computer program product of claim 37, wherein the method further comprises:
determining a first time duration for the first resource type gain at the source system;
determining a second time duration for the first resource type gain at the destination system; and
calculating the cost-benefit metric as a function of the determined first resource type gains at the first and second systems weighted by the first and second time durations, respectively.

39. The computer program product of claim 38, wherein at least one of the first and second time duration is an estimated stable period of time.

40. The computer program product of claim 36, wherein the method further comprises:
determining the migration time as a function of at least one of:
an amount of memory used by the first VM;
a working set size of the first VM; and
an amount of network bandwidth used by the first VM.

41. The computer program product of claim 36, wherein the method further comprises:
determining the amount of the first resource type to which the first VM is entitled as a function of at least one of:
an amount of the first resource type used by the first VM;
one or more quality-of-service parameters associated with the first VM; and
one or more parameters used to determine an allocation of resources to the first VM.

42. The computer program product of claim 36, wherein the calculating of the first resource type cost-benefit metric as said function of the determined migration time includes applying the determined migration time as a weight to a gain of the first resource type during a migration to determine the first resource type cost-benefit metric.

\* \* \* \* \*